US005421234A

United States Patent [19]

Liao

[11] Patent Number: 5,421,234
[45] Date of Patent: Jun. 6, 1995

[54] PEDAL MECHANISM COUPLING DEVICE

[75] Inventor: Tsun-Chi Liao, Taichung, Taiwan, Prov. of China

[73] Assignee: Hwa Shin Musical Instrument Co., Ltd., Taichung, Taiwan, Prov. of China

[21] Appl. No.: 297,851

[22] Filed: Aug. 30, 1994

[51] Int. Cl.$^{6}$ .............................................. G01D 13/02
[52] U.S. Cl. .................................................. 84/422.1
[58] Field of Search ................. 84/422.1, 422.2, 422.3, 84/422.4

[56] References Cited

U.S. PATENT DOCUMENTS 5,204,485 4/1993 Lombardi ........................... 84/422.1

*Primary Examiner*—M. L. Gellner
*Assistant Examiner*—Patrick J. Stanzione
*Attorney, Agent, or Firm*—Bacon & Thomas

[57] ABSTRACT

A pedal mechanism coupling device for coupling the pivot shaft of a first pedal mechanism to the pivot shaft of a second pedal mechanism permitting the beaters of both pedal mechanism to be separately controlled to beat a base drum, the coupling device having a hexagonal axial hole and a radial screw hole at one end to hold a hexagonal link by a tightening up screw, which link is turned back and forth relative to the coupling device. A and two axle bearings longitudinally aligned at an opposite end to hold the pivot shaft of the first pedal mechanism to the coupling device by a headed screw permitting to the pivot shaft of the first pedal mechanism to be turned back and forth relative to the coupling device a tightening up screw threaded into the radial screw hole on said base block to hold down said hexagonal link, two bearing chambers defined within said base block and said cover block, two axle bearings received in said bearing chambers and longitudinally aligned.

1 Claim, 5 Drawing Sheets

PEDAL MECHANISM COUPLING DEVICE

BACKGROUND OF THE INVENTION

The present invention relates to musical instrument, and relates more particularly to a coupling device for coupling two pedal mechanisms together permitting the beaters of the pedal mechanism to be separately driven to beat a base drum.

The pedal mechanism of a base drum is generally comprised of a pedal, a beater, and a transmission mechanism connected between the pedal and the beater. This structure of pedal mechanism can only beat the base drum intermittently causing the base drum to produce a monotonous sound. In order to play a fancy performance, two beaters are needed for beating the base drum. FIG. 1 shows a pedal system comprised of a first pedal mechanism and a second pedal mechanism linked by a link, a first beater pivotally mounted around a pivot shaft on the first pedal mechanism and driven by the pedal of the first pedal mechanism, and a second beater pivotally mounted on the first pedal mechanism by a coupling device and driven by the pedal of the second pedal mechanism. The coupling device, as shown in FIG. 2, comprises a circular rod section at one end having a circular hole and an axle bushing mounted within the circular hole and coupled to one end of the pivot shaft of the first pedal mechanism, and an coupling portion at an opposite end connected to the second pedal mechanism by the link. The second beater is perpendicularly connected to the circular rod section of the coupling device. Therefore, the first and second beaters can be separately driven to beat the base drum. This structure of coupling device is complicated and difficult to manufacture. The axle bushing must be precisely processed so that the coupling device can be smoothly turned relative to the pivot shaft of the first pedal mechanism. If the coupling device and the pivot axle are not precisely coaxially coupled together due to a small size error, the respective reciprocating motion of the first and second beaters will interfere with each other.

SUMMARY OF THE INVENTION

The present invention has been accomplished to provide pedal mechanism coupling device which eliminates the aforesaid drawbacks. According to one aspect of the present invention, the coupling device has one end coupled to the pivot shaft of the first pedal mechanism by bearings and an opposite end coupled to the pivot shaft of the second pedal mechanism by a link so that the first and second pedal mechanism can be separately operated without interfering with each other. Because the pivot shaft of the first pedal mechanism is supported on the axle bearings, it can be smoothly and alternatively turned back and forth. According to another aspect of the present invention, the coupling device is comprised of two parts fastened together by screws to hold the bearings on the inside so that the bearings can be replaced when they wear with use.

DETAILED DESCRIPTION OF THE PREFERRED EMBODIMENT

Figure 1:
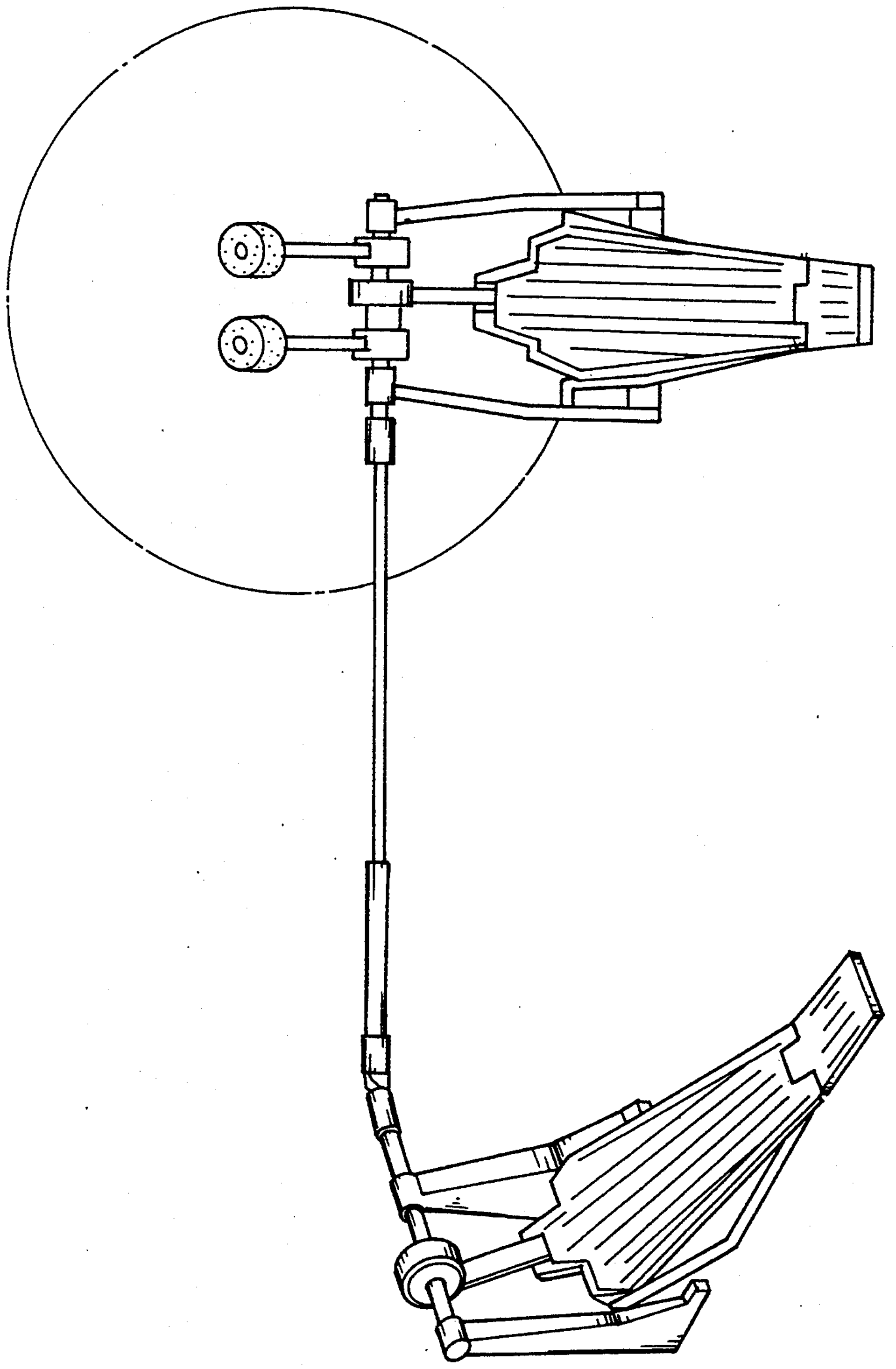
Fig.1 PRIOR ART
FIG. 1 shows two pedal mechanisms linked according to the prior art.
Figure 2:
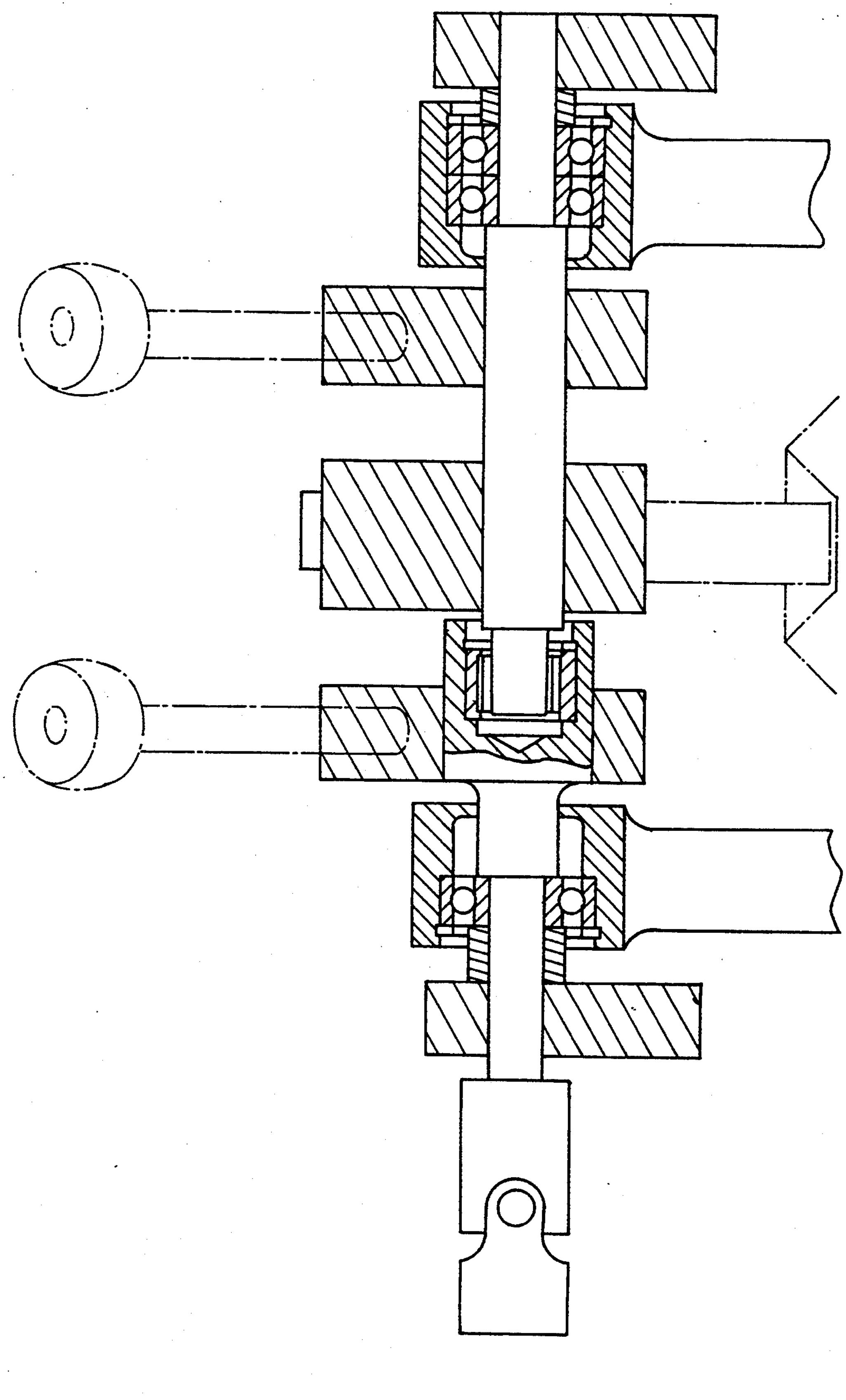
Fig.2 PRIOR ART
FIG. 2 is a sectional view in an enlarged scale taken on part of FIG. 1, showing the structure of the coupling device thereof.
Figure 3:
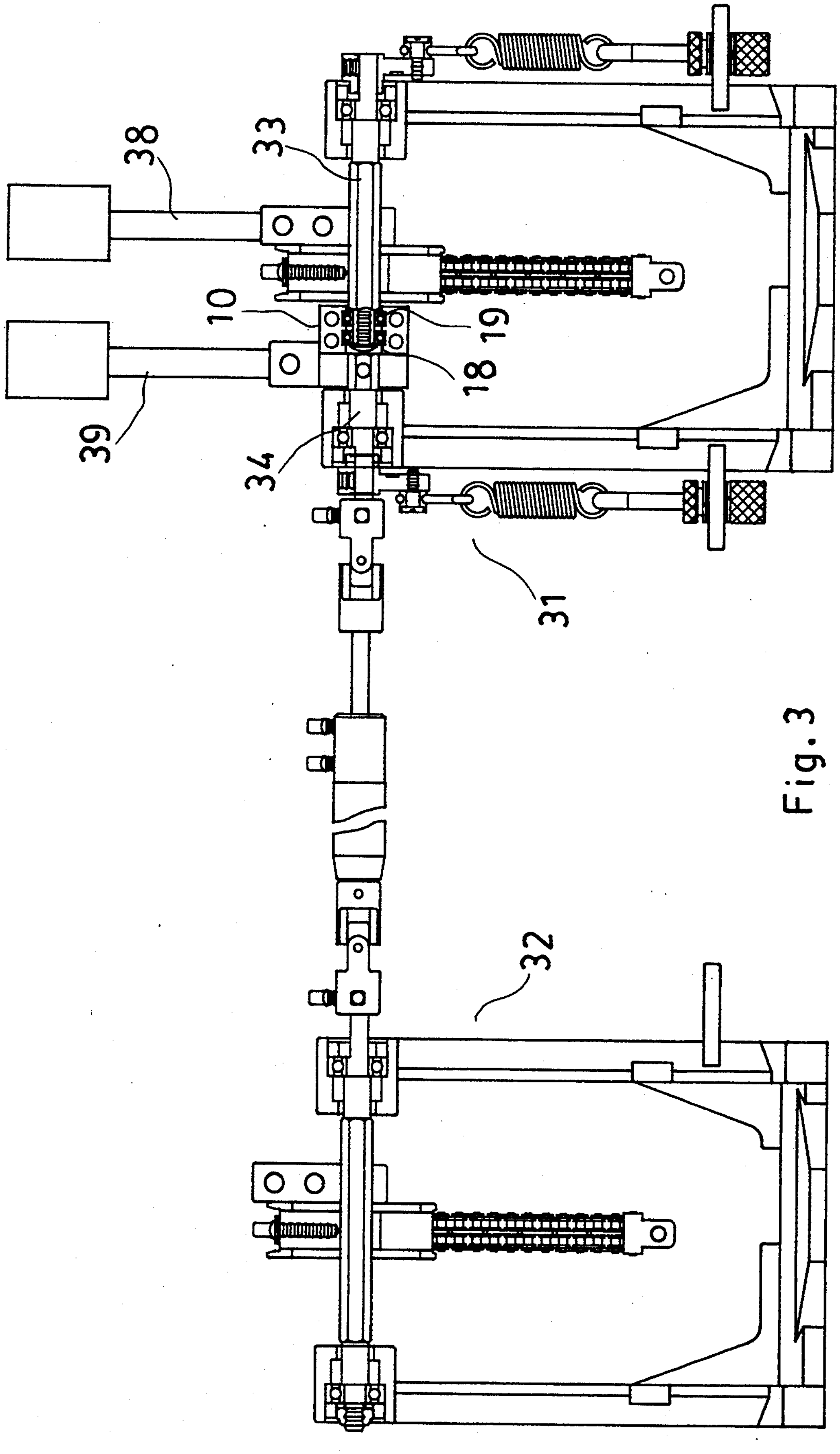
FIG. 3 shows two pedal mechanisms coupled by a coupling device according to the present invention.
Figure 4:
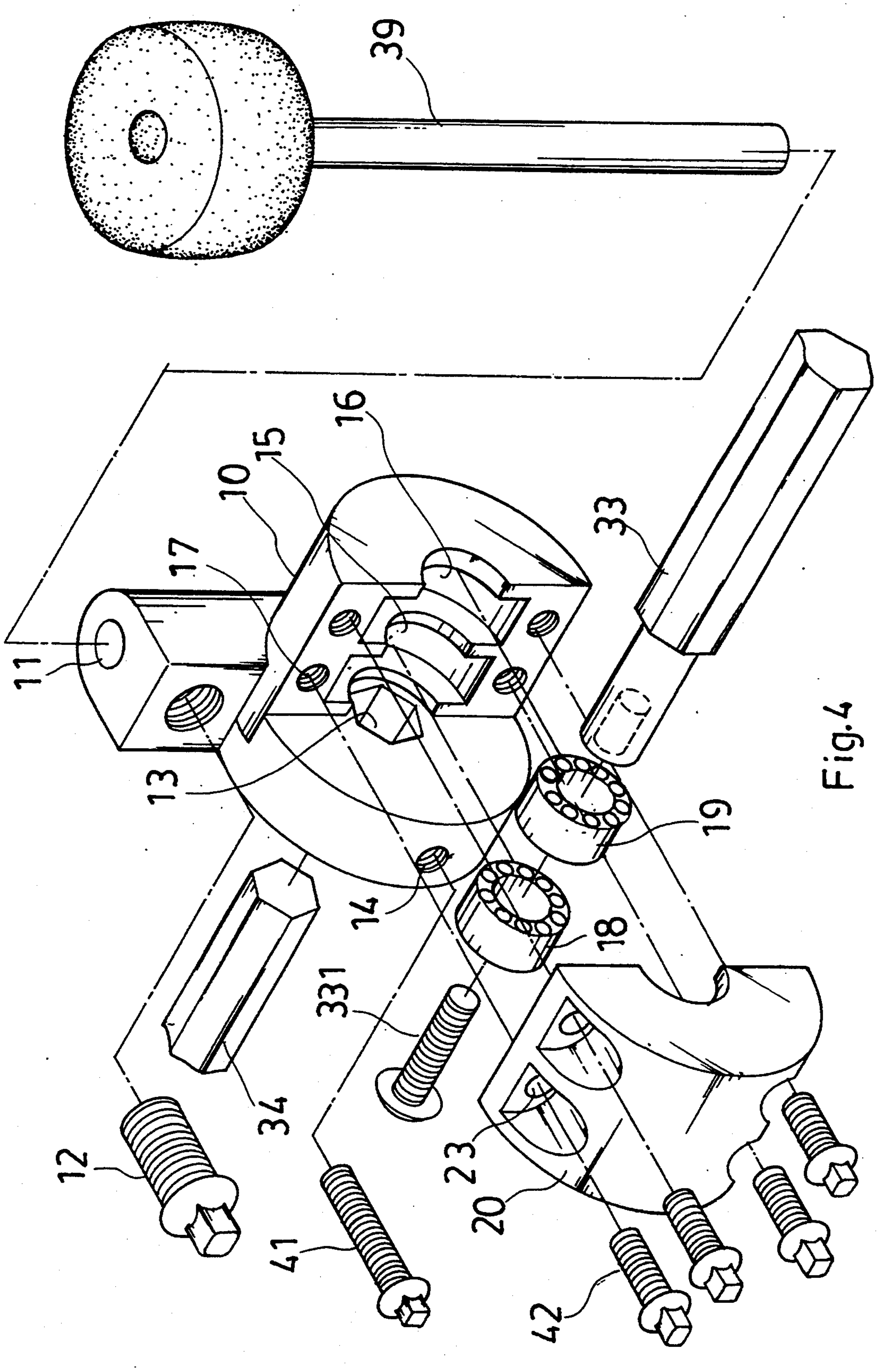
FIG. 4 is an exploded view of the coupling device shown in FIG. 3.
Figure 5:
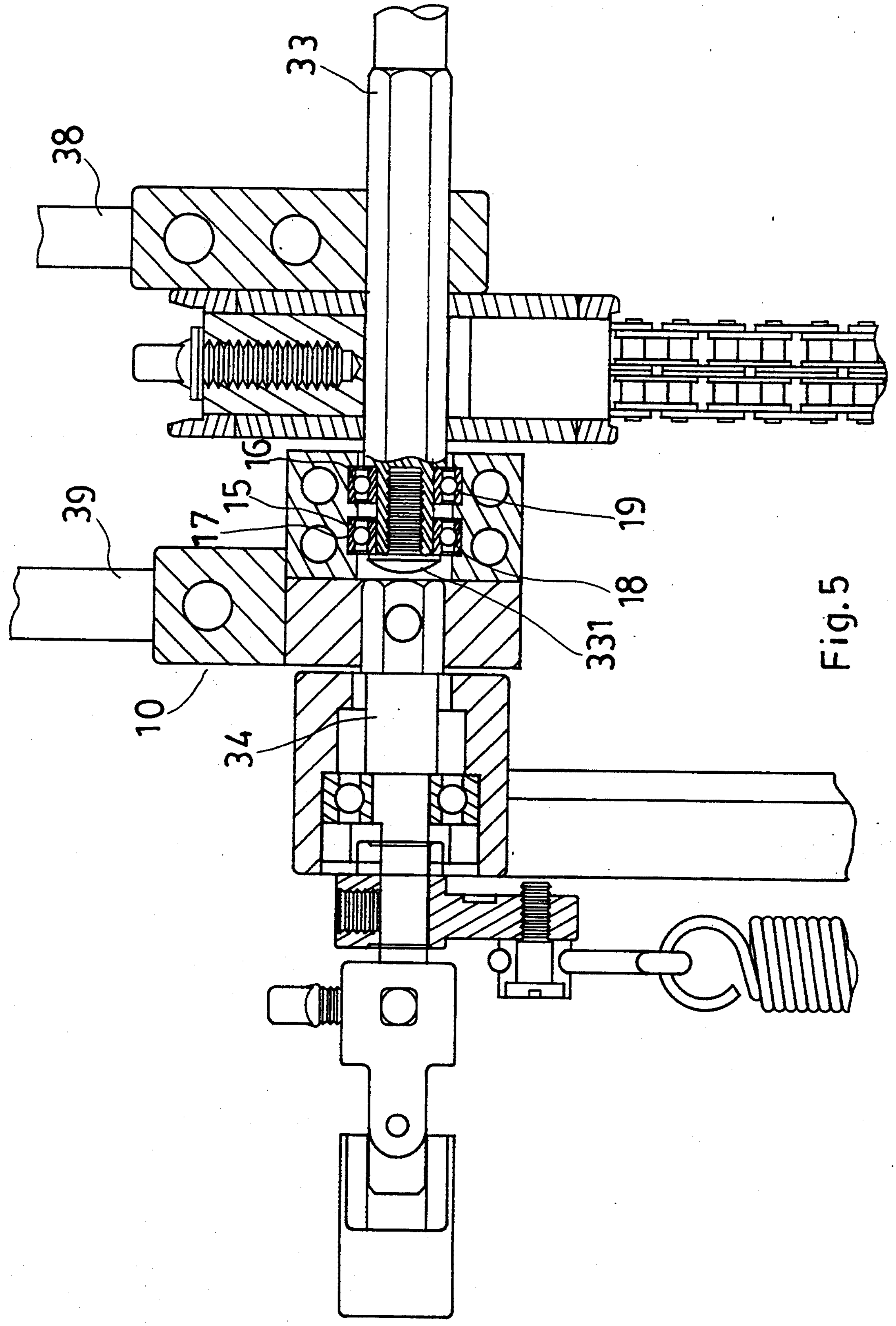
FIG. 5 is a sectional view in an enlarged scale taken on part of FIG. 3, showing the positioning of the coupling device.

Referring to FIGS. 3, 4, and 5, a coupling device 10 is provided for coupling a first pedal mechanism 31 and a second pedal mechanism 32 together. The coupling device 10 is made of cylindrical shape having a unitary beater receptacle 11 at one side for holding the beater 39 of the second pedal mechanism 32 permitting the beater 39 to be fixed in position by a tightening up screw 12. The rear $\frac{2}{3}$ of the length of coupling device 10 is partially cut away and formed into a half round rod section and then covered by a half-round cover shell 20. The front $\frac{1}{3}$ of the length of the coupling device 10 has a hexagonal through hole 13 axially disposed in the center. A screw hole 14 is made on the front $\frac{1}{3}$ of the length of the coupling device 10 in a radial direction and perpendicularly connected to the hexagonal through hole 13. A hexagonal link 34 is inserted into the hexagonal through hole 13 and then fixed to the coupling device 10 by threading a tightening up screw 41 into the screw hole 14. The opposite end of the hexagonal link 34 is coupled to the pivot shaft of the second pedal mechanism 32. The half-round rod section (also referenced by 10) of the coupling device 10 defines two half-round bearing chambers 15 and 16 and two series of radial screw holes 17 arranged in the axial direction at two opposite sides by the half-round bearing chambers 15 and 16. The half-round cover shell 20 comprises two half-round bearing chambers (not shown) respectively matched with the half-round bearing chambers 15 and 16 to hold two axle bearings 18 and 19, and two series of radial countersunk holes 23 respectively connected to the screw holes 17 by screws 42. Before the cover shell 20 and the half-round rod section 10 are fastened together, the pivot shaft 33 of the first pedal mechanism is inserted through the axle bearings 18 and 19 and then fastened with a headed screw 331. Therefore, the pivot shaft 33 of the first pedal mechanism can be turned relative to the axle bearings 18. When the beater 38 of the first pedal mechanism 31 is alternatively turned back and forth by the pivot shaft 33 to beat the base drum (not shown), the coupling device 10 is maintained free from the transmission force of the pivot shaft 33; when the beater 39 of the second pedal mechanism 32 is alternatively turned back and forth by the coupling device 10 to beat the base drum, the pivot shaft is maintained free from the transmission force of the coupling device 10. Therefore, the beaters 38 and 39 can be separately driven by the first and second pedal mechanism to beat the base drum without interfering the operation from each other.

I claim:

1. A coupling device for coupling the beater of an auxiliary pedal mechanism to the pivot shaft of a master pedal mechanism permitting the beaters of said master and auxiliary pedal mechanism to be separately driven to beat a base drum, the coupling device comprising a base block and a cover block fastened together by screws, a hexagonal axial hole on said base block, which receives a hexagonal link, which is turned back and forth by said auxiliary pedal mechanism, a radial screw hole on said base block, a tightening up screw threaded into the radial screw hole on said base block to hold down said hexagonal link, two bearing chambers defined within said base block and said cover block, two axle bearings received in said bearing chambers and longitudinally aligned with said hexagonal axial hole, a headed screw inserted through said axle bearings and fastened to one end of the pivot shaft of said master pedal mechanism to hold said coupling device to the pivot shaft of said master pedal mechanism permitting the pivot shaft of said master pedal mechanism to be turned relative to said axle bearings.

* * * * *